March 9, 1965 H. M. REYNOLDS ETAL 3,172,606

SPRAYING APPARATUS

Filed April 25, 1960 9 Sheets-Sheet 1

INVENTORS
HARRY M. REYNOLDS
LELAND C. HESS, JR.
STEPHEN M. HALLIDAY
BY
MAHONEY, MILLER & RAMBO, ATTY'S.
BY Wm. V. Miller

SPRAYING APPARATUS

Filed April 25, 1960 9 Sheets-Sheet 2

INVENTORS
HARRY M. REYNOLDS
LELAND C. HESS, JR.
STEPHEN M. HALLIDAY
BY
MAHONEY, MILLER & RAMBO, ATTY'S.
BY Wm. V. Miller March 9, 1965 H. M. REYNOLDS ETAL 3,172,606

SPRAYING APPARATUS

Filed April 25, 1960 9 Sheets-Sheet 3

INVENTORS
HARRY M. REYNOLDS
LELAND C. HESS, JR.
STEPHEN M. HALLIDAY
BY
MAHONEY, MILLER & RAMBO, ATTY'S
BY Wm. V. Miller INVENTORS
HARRY M. REYNOLDS
LELAND C. HESS, JR.
STEPHEN M. HALLIDAY
BY
MAHONEY, MILLER & RAMBO, ATTY'S.
BY Wm. V. Miller INVENTORS
HARRY M. REYNOLDS
LELAND C. HESS, JR.
STEPHEN M. HALLIDAY
BY
MAHONEY, MILLER & RAMBO, ATTY'S.
BY Wm. V. Miller

SPRAYING APPARATUS

Filed April 25, 1960 9 Sheets-Sheet 6

*INVENTORS*
HARRY M. REYNOLDS
LELAND C. HESS, JR.
STEPHEN M. HALLIDAY
*BY*
MAHONEY, MILLER & RAMBO, ATTY'S.
BY Wm. V. Miller INVENTORS
HARRY M. REYNOLDS
LELAND C. HESS, JR.
STEPHEN M. HALLIDAY
BY
MAHONEY, MILLER & RAMBO, ATTY'S.
BY Wm. V. Miller March 9, 1965 H. M. REYNOLDS ETAL 3,172,606

SPRAYING APPARATUS

Filed April 25, 1960 9 Sheets-Sheet 8

*INVENTORS*
HARRY M. REYNOLDS
LELAND C. HESS, JR.
STEPHEN M. HALLIDAY

*BY*
MAHONEY, MILLER & RAMBO, ATTY'S.

BY Wm. V. Miller

SPRAYING APPARATUS

Filed April 25, 1960 9 Sheets-Sheet 9

INVENTORS
HARRY M. REYNOLDS
LELAND C. HESS, JR.
STEPHEN M. HALLIDAY
BY
MAHONEY, MILLER & RAMBO, ATTY'S.
BY Wm. V. Miller

United States Patent Office 3,172,606
Patented Mar. 9, 1965

3,172,606

SPRAYING APPARATUS

Harry M. Reynolds, 420 E. 5th Ave., Columbus 1, Ohio, and Leland C. Hess, Jr., Canal Winchester, and Stephen M. Halliday, Columbus, Ohio; said Hess and said Halliday assignors to said Reynolds Filed Apr. 25, 1960, Ser. No. 24,308
2 Claims. (Cl. 239—186)

This invention relates to spraying apparatus. It has to do, more particularly, with spraying apparatus which is particularly useful for projecting an atomized spray of liquid lubricant onto an object such as a mold. It is especially adaptable to a glass-forming machine for spraying the lubricant into the glass molds before the molten glass is supplied thereto for forming therein.

At the present time, it is customary in glass plants to use oil or similar liquid lubricants in the forming molds. It is important that the liquid lubricant be atomized and sprayed on the molds in order to uniformly coat the molds with a film of the lubricant before the forming operation. However, the atomized spray must be of such a nature and applied only during a selected interval so as not to be excessive, which would tend to build up a heavy carbon deposit which is one of the disadvantages of the hand-swabbing method. Furthermore, it is necessary that the apparatus be capable of being mounted on a glass-forming machine in such a manner that it will not interfere with the intricate mechanism thereof. Also, it is imperative that the spraying apparatus be capable of being timed with the moving mechanism of the glass-forming machine so that it will not interfere with the mechanism which feeds the glass to the molds, with the glass-forming mechanism, and with the transfer mechanism as well as other moving parts of the machine. It is not only important to apply the spray to the molds during selected intervals, but it is important that the length of spray interval, the instant it starts and stops, and the amount of lubricant atomized and sprayed, be adjustable to meet various conditions of operation of a particular machine or of various machines to which the apparatus may be applied. Also, it is important that the spray heads or nozzles of the apparatus be movable into and out of association with the molds of the glass-forming machine in timed relationship with the machine and that the speed of movement and the extent of movement of these heads be variable so that the apparatus can be applied to various machines or can be adjusted to meet different operating conditions of a particular machine.

In its preferred form, this invention contemplates the provision of apparatus in the form of a double-acting or reversible ram or cylinder and piston unit which carries one or more spray heads or atomizing nozzles. The cylinder and piston unit is preferably air-actuated and means is associated therewith for supplying a liquid lubricant, such as oil, and atomizing air to the spray heads in timed relationship to the actuation of the cylinder and piston unit. A control is provided for starting the stroke of the cylinder and piston unit to project the head into lubricating position relative to the article to be lubricated, such as the mold of a glass-forming machine, and this control is preferably actuated by a moving part of the machine. Control means is provided to vary the stroke of the cylinder and piston unit and thereby vary the extent of movement of the spray heads and control means is provided for varying the speed of the stroke of the cylinder and piston unit. Furthermore, a control means is provided which is actuated by relative movement of the cylinder and piston of the unit for varying the instant at which it reverses to withdraw the spray head. In addition, a control means is provided which is actuated by relative movement of the cylinder and piston of the unit for determining the instant the spraying action starts and the instant it stops and this conrol means is adjustable to vary the instant of starting and stopping relative to movement of the spray head. Furthermore, it is adjustable to vary the length of the spray period. Also, a control is provided for varying the amount of lubricant sprayed. The entire apparatus is such that it is controlled automatically by the machine with which it is associated to uniformly spray the molds thereof with the desired coating of lubricant and without interfering with normal operation thereof. Furthermore, the apparatus is such, as indicated above, that it can be readily adjusted to meet various conditions.

In the accompanying drawings, a preferred embodiment of this invention is illustrated but it is to be understood that various specific details may be varied without departing from basic principles of this invention.

Figure 1:
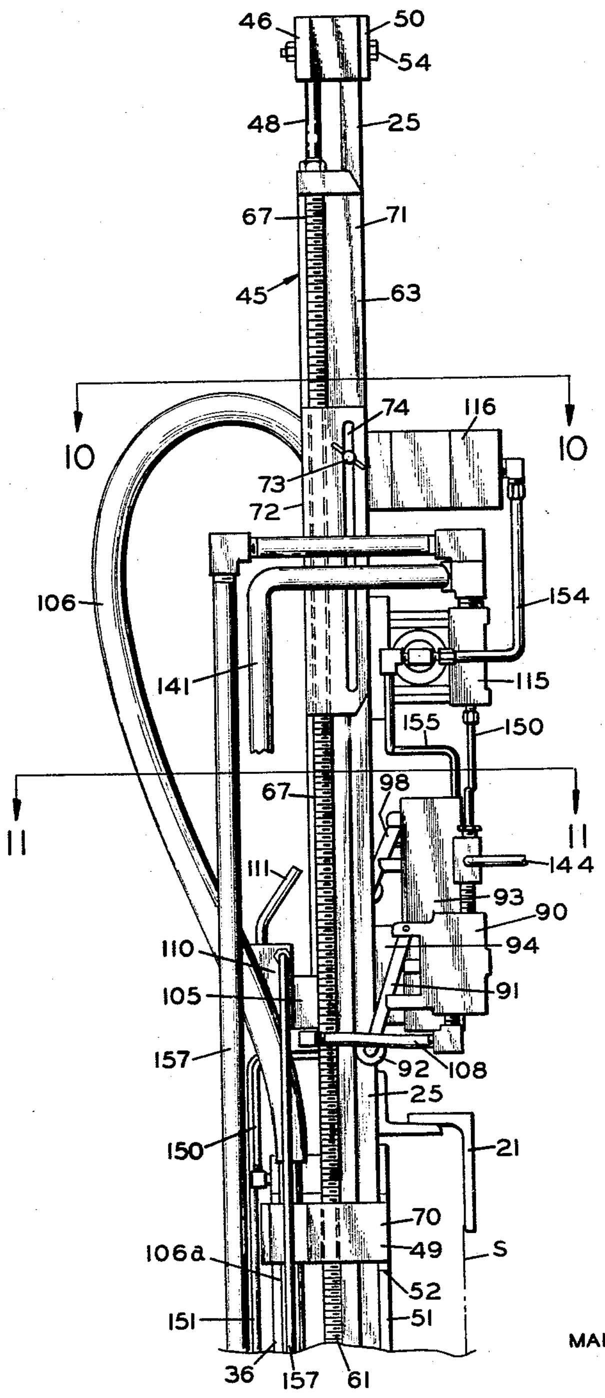
FIGURE 1 is a side elevational view of the upper portion of the spraying apparatus.
Figures 2, 3, 4, 5, 6:
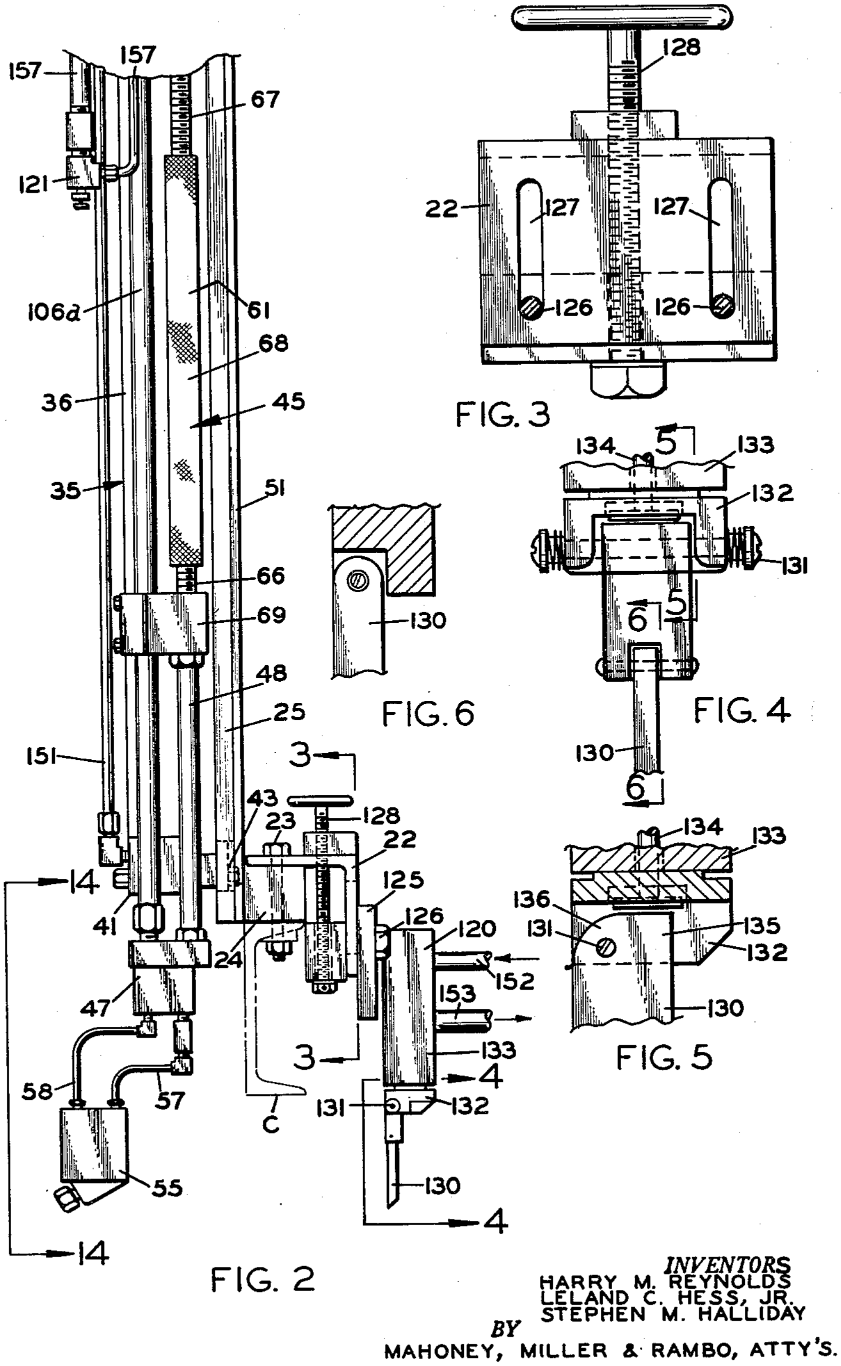
FIGURE 2 is a side elevational view showing the lower portion of the spraying apparatus, being a downward continuation of FIGURE 1.
FIGURE 3 is an enlarged detail in vertical section taken along line 3—3 of FIGURE 2.
FIGURE 4 is an enlarged detail in side elevation taken along line 4—4 of FIGURE 2.
FIGURE 5 is a vertical sectional view taken along line 5—5 of FIGURE 4.
FIGURE 6 is a vertical sectional view taken along line 6—6 of FIGURE 4.
Figure 7:
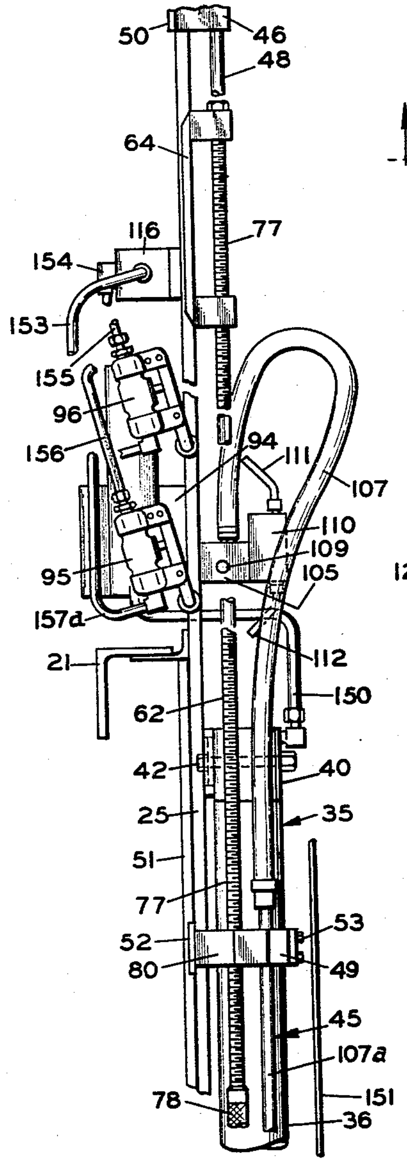
FIGURE 7 is a side elevational view of the upper portion of the spraying apparatus taken along line 7—7 of FIGURE 8 at the side opposite to that shown in FIGURE 1.

With reference to the drawings, the spraying apparatus is illustrated in a vertical or upright position in FIGURES 1 and 2 but it is to be understood that it can be disposed in horizontal position if desired. In FIGURES 21 to 24, it is shown associated with a glass-forming machine for spraying lubricant into the molds thereof but, as previously indicated, it can be used in connection with other machines in which a moving part thereof starts the cycle of the spraying apparatus. As previously indicated, the controls of the spraying apparatus are such that the operation of the spraying apparatus can be timed accurately with the operation of the machine so as not to interfere with the functioning parts thereof. As a specific example of a machine with which the spraying apparatus can be employed, there are illustrated in FIGURES 21 to 24 certain parts of a glass forming machine known as a Hartford I. S. machine with which this spraying apparatus has been successfully used. The spraying apparatus is adapted to spray lubricant into the opened blank molds B thereof, before they receive the glass gobs, and the spraying cycle of the spraying apparatus is adapted to be initiated by the movement of an inverting or transfer arm I thereof which swings about an axis A in removing a previously formed blank from the blank mold and transferring it to a blow mold or finish mold F. This machine also is shown as including an upper supporting beam S (FIGURE 1) from which the spraying apparatus is suspended by an upper hanger bracket 21 and a lower supporting channel C (FIGURE 2) to which the lower end of the apparatus is attached so that it will remain in vertical position. This attachment is made by means of an angle bracket 22 which is bolted by bolts 23 to a block 24 which rests on the upper flange of the channel C, the bolts also passing through such flange to clamp the block 24 to the flange. This block 24 is rigidly attached, such as by bolting, to the lower end of a vertical guide rail 25 of the spraying apparatus and the hanger bracket 21 is similarly attached to the rail 25 toward the upper end thereof. This latter bracket is of hook form and merely slips downwardly over the beam S.

Figure 20:
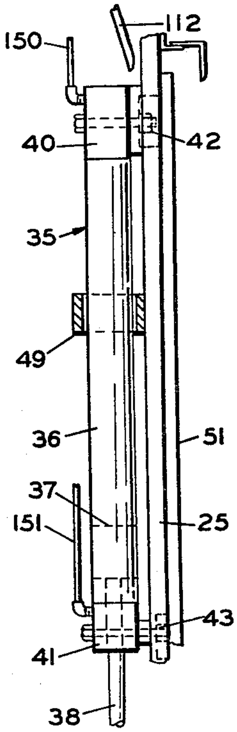
FIGURE 20 is a schematic view of the cylinder and piston unit and associated parts of the spraying apparatus.

The guide rail 25 is mainly of flat bar form as shown in FIGURES 1, 2, 7 to 11, and 13, and extends vertically throughout the height of the apparatus, assuming that the piston of the cylinder and piston unit 35 which it carries is retracted. The cylinder and piston unit 35 (FIGURE 20) comprises a cylinder 36 having a piston 37 slidable vertically therein, a piston rod 38 depending from the piston and projecting through the lower end of the cylinder. The cylinder 36 is carried by upper and lower cylinder blocks 40 and 41, respectively, which are bolted to the guide rail 25 by the bolts and slot connections 42 and 43, respectively. The bolts may be released so that the cylinder may be adjusted vertically along the guide rail 25.

Mounted for vertical sliding movement relative to the cylinder 36 is a carriage 45 which consists mainly of the upper crosshead 46 (FIGURE 1) and the lower crosshead or manifold 47 (FIGURE 2) which are connected together in fixed vertically spaced relationship by a pair of laterally spaced, vertically-extending guide rods 48. The carriage also includes the intermediate crosshead 49 which is clamped in a fixed vertical position on the rods 48. The upper crosshead 46 (FIGURE 9) carries by means of the bolts 54 the guide lugs 50 which extend over the rear surface of the guide rail 25. Thus, this crosshead is slidably mounted on the guide rail 25 and is guided vertically thereby.

The intermediate crosshead 49 (FIGURE 13) has the guide rods 48 extending downwardly therethrough and clamped in position within the crosshead by the bolts 53. The crosshead is mounted for sliding vertical movement relative to the cylinder 36 on the guide rail 25. This rail 25 is provided with a tongue 51 fixed on the rear surface thereof and which is of less width than the rail. Gibs 52 suitably attached to the crosshead 49 extend behind the rail 25 and cooperate therewith and with the edges of the tongue 51 in guiding vertical movement of the crosshead 49.

The guide rods 48 extend alongside the cylinder 36 and the lower ends thereof are connected to the lower crosshead or spray head manifold 47, as shown in FIGURES 2, 14, 15 and 16. This manifold 47 will carry a selected number of spray heads or atomizing nozzles 55 for vertical movement therewith and with the carriage 45. This vertical movement is controlled by the cylinder and piston unit 35. The lower end of the cylinder rod 38 of this unit is connected at 56 (FIGURE 14) to the manifold 47 so that it will move it vertically upon actuation of the unit. Each head or nozzle 55 is connected to the manifold 47 by an air line 57 and a lubricant line 58 (FIGURE 2). The spray heads or atomizing nozzles 55 are not shown in detail but are of any suitable type in which the stream of oil supplied thereto by the lubricant line 58 is atomized by the air under pressure supplied by the line 57. The nozzles automatically open when air is supplied thereto and automatically close when the supply of air is interrupted.

Outwardly of and parallel with the guide rods 48 are the cam-adjusting turnbuckles 61 and 62 which are carried by the carriage 45, as shown in FIGURES 1, 7 to 11, and 13. The turnbuckle 61 is associated with and adjusts a spray cam 63 and the turnbuckle 62 is associated with and adjusts a reversing cam 64.

The turnbuckle 61 (FIGURE 2) comprises oppositely extending rod sections 66 and 67 which at their inner ends thread into a sleeve 68 (FIGURES 2 and 3) which is preferably knurled to facilitate rotation. The rods 66 and 67 are oppositely threaded and are suitably mounted on the carriage 45. Thus, the lower end of the rod 66 is rotatably mounted but axially fixed in a turnbuckle block 69 (FIGURE 2) and the upper end of the rod 67 (FIGURE 1) is rotatably mounted but axially fixed in the cam 63 and this rod is also rotatably mounted in a block 70 (FIGURE 13) attached to the intermediate crosshead 49. The block 69 is clamped in a fixed position longitudinally of the guide rods 48.

Figure 8:
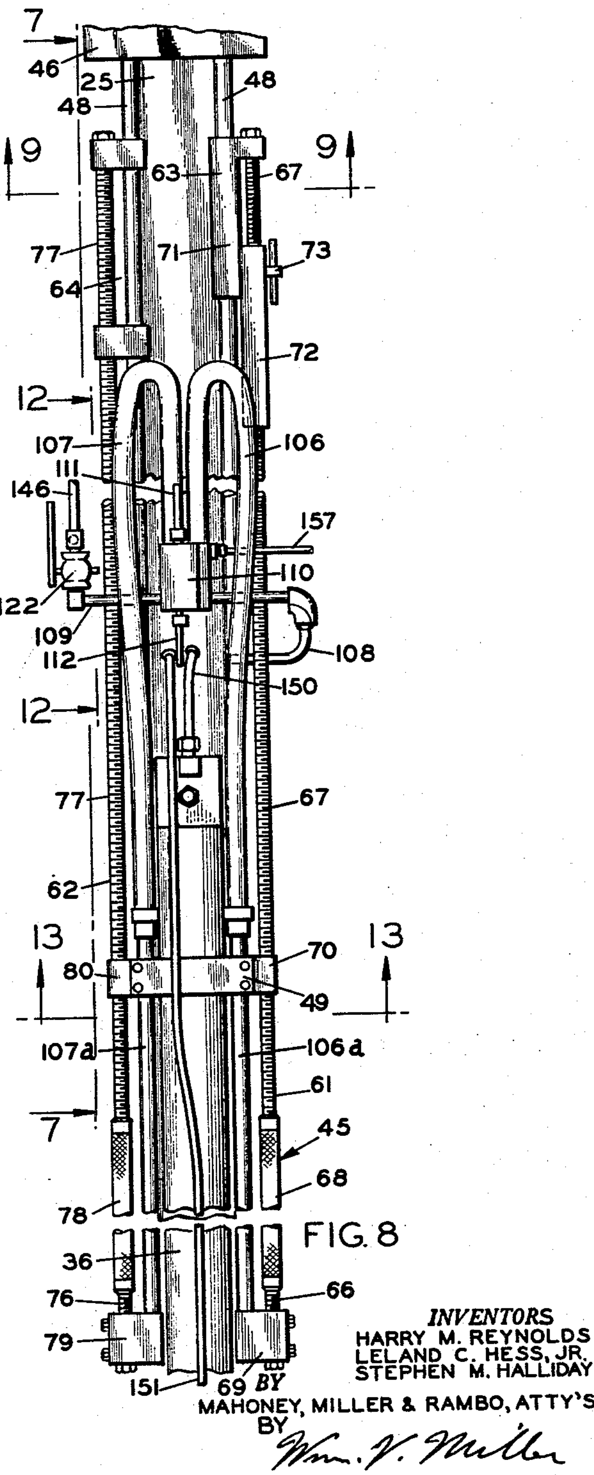
FIGURE 8 is a front elevational view of the upper portion of the spraying apparatus.
Figure 9:
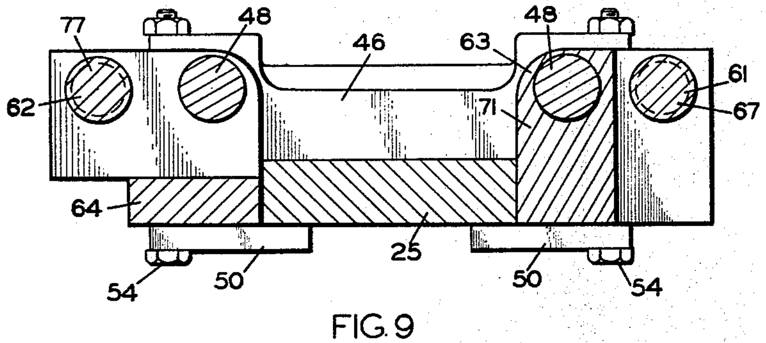
FIGURE 9 is a horizontal sectional view taken along line 9—9 of FIGURE 8.
Figure 10:
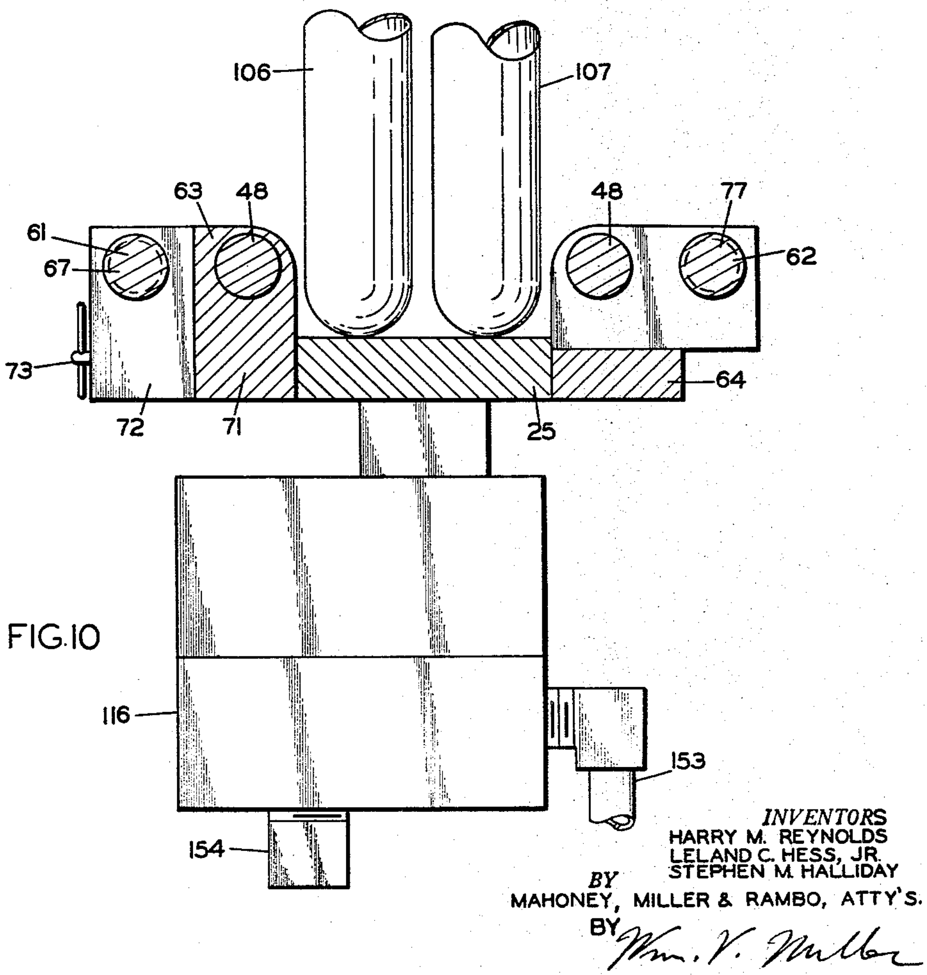
FIGURE 10 is a horizontal sectional view taken along line 10—10 of FIGURE 1.
Figure 11:
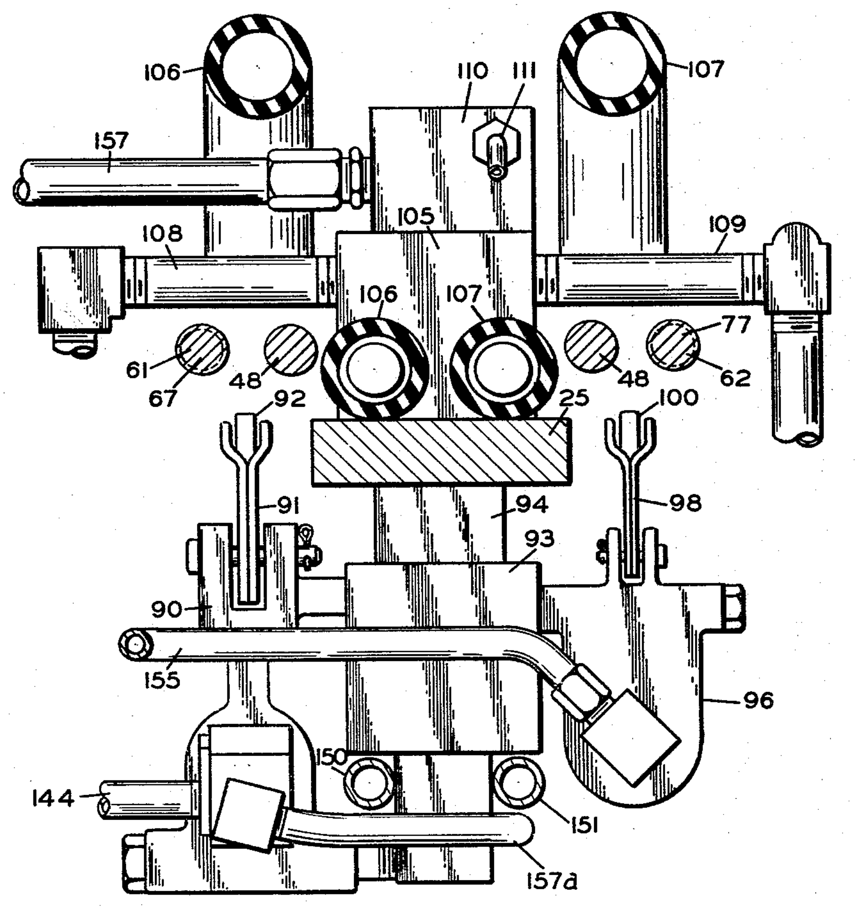
FIGURE 11 is a horizontal sectional view taken along line 11—11 of FIGURE 1.

The cam 63 is composed of telescoping sections so that its length is adjustable, as shown in FIGURES 1, 8 and 10. Thus, the cam 63 comprises sections 71 and 72 disposed side-by-side and slidable relatively. The section 71 is slidably mounted on the adjacent guide rod 48 and the section 72 rotatably receives the outer end of the threaded rod 67 but is in a fixed position axially thereof. The two cam sections 71 and 72 are in face contact and are slidably connected together by a clamp bolt 73 which passes into a threaded opening in the section 71 and through an elongated slot 74 in the section 72. Thus, when the bolt 73 is loosened, the two cam sections 71 and 72 may be extended or retracted relatively and then clamped in adjusted position. When clamped in adjusted position, and the turnbuckle adjusting sleeve 68 is rotated, the turnbuckle will move the cam 63 as a unit along the guide rod 48 which carries it and move it to a different position along the carriage 45. It will be noted that the cam section 71 has a beveled upper end leading to a flat outer surface and that the cam section 72 has a beveled lower end leading to a flat outer surface.

The turnbuckle 62 (FIGURES 7, 8, 11 and 13) is similar to the turnbuckle 61 in that it comprises oppositely threaded rod sections 76 and 77 which extend in opposite directions from the knurled adjusting sleeve 78. The lower end of the rod section 76 is rotatably mounted in a turnbuckle block 79 and is fixed axially therein. The block 80 is clamped in fixed position to the crosshead 49. The upper end of the rod section 77 is rotatably mounted in the cam 64 but is fixed axially therein. This rod section 77 also passes upwardly through a block 80 which is fixed to the intermediate crosshead 49 and is rotatable therein. The cam 64 is slidably mounted on the adjacent guide rod 48. Thus, rotation of the sleeve 78 will move the cam 64 to different positions along the carriage 45. It will be noted that the cam 64 has beveled upper and lower ends leading to a flat outer surface.

The spray cam 63 which moves with the carriage 45 actuates a valve 90 (FIGURE 1) which controls the spray heads 55. This valve 90 is provided with a pivoted actuating arm or lever 91 which carries a cam follower in the form of a roller 92. The valve 90 is mounted in a fixed position and in such a location that when the carriage 45 moves from its uppermost position to its lowermost position, the cam 63 will engage the roller 92 and actuate the valve 90 to open it. It will continue to keep the valve open as long as the cam 63 contacts with the roller, and the duration of this period will depend on the length of the cam which can be changed by relative adjustment of the sections 71 and 72 thereof. The position of the cam 63 along the carriage 45 can be varied bodily by means of the turnbuckle 61 to vary the instant when the spray starts. The valve 90 is carried at one side of the rail 25 (FIGURES 1 and 11) by a valve-mounting block 93 which is rigidly attached through a shim-block 94 to the rear surface of the rail 25.

Figure 12:
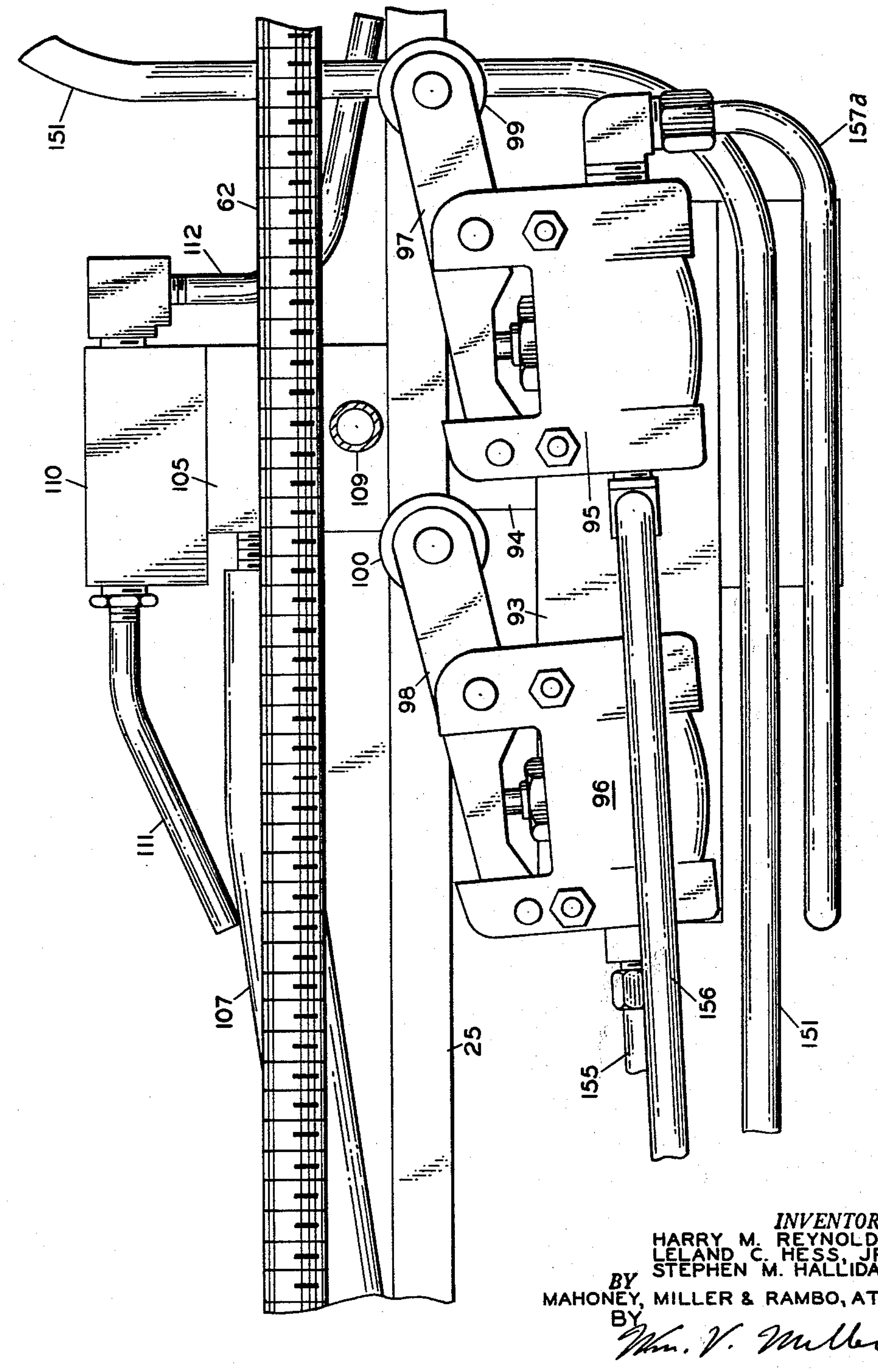
FIGURE 12 is an enlarged side elevational view of a portion of the apparatus taken along line 12—12 of FIGURE 8 showing two of the control valves.
Figure 13:
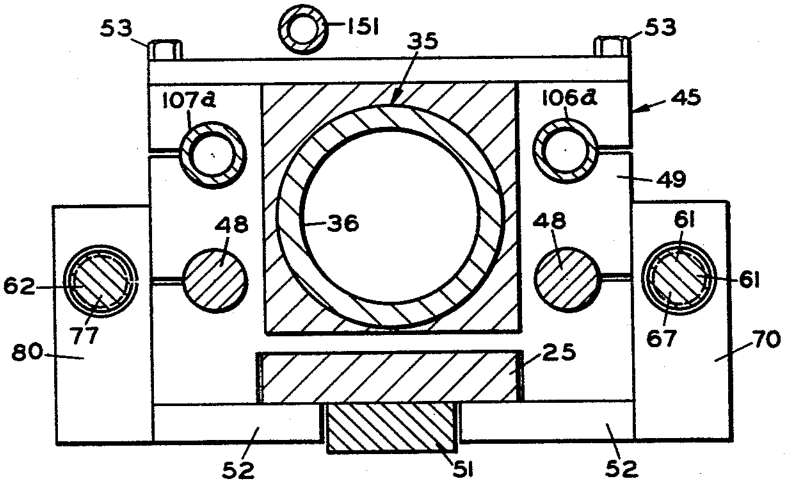
FIGURE 13 is a horizontal sectional view taken along line 13—13 of FIGURE 8.

The reversing cam 64 which also moves with the carriage 45 actuates two valves, namely a reversing valve 95 and an exhaust valve 96 (FIGURES 7, 11 and 12) disposed in tandem relationship at the opposite side of the rail 25. Both of these valves 95 and 96 are carried in fixed position at the opposite side of the block 93. The valves 95 and 96 are provided, respectively, with the pivoted actuating levers 97 and 98 which carry the rollers 99 and 100. During downward movement of the carriage 45 from its uppermost position shown in FIGURES 1 and 2, these rollers 100 and 99 are successively engaged by the cam 64 to successively open the valves 96 and 95. The instants when these valves are opened can be varied by rotating the turnbuckle sleeve 78 to reset the position of the cam 64 along the carriage 45.

Figure 14:
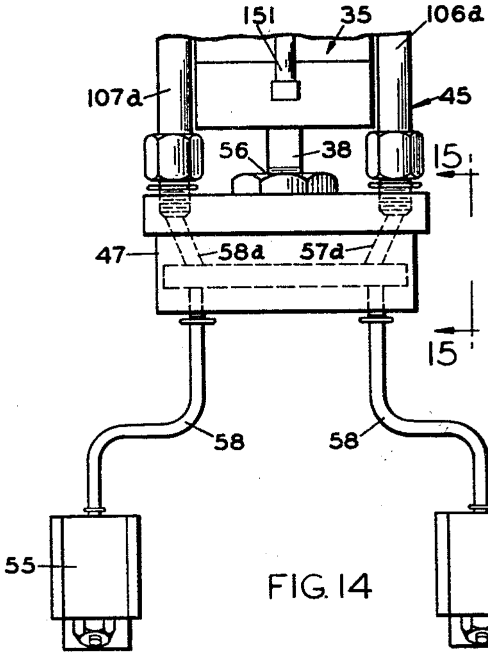
FIGURE 14 is an enlarged elevational view of the lower end of the apparatus and particularly the spray head arrangement thereof taken substantially along line 14—14 of FIGURE 2.

Opposite the valve-mounting block 93 (FIGURES 1, 7 and 12) on the front of the guide rail 25 there is fixed a connector block 105. The block 105 is located above the cylinder 36 but at a sufficiently low point on the rail 25 that the crosshead 46 will not interfere therewith as the carriage 45 moves downwardly to its lowermost spraying position. A pair of hoses 106 and 107 lead from the connector block 105 to the carriage 45 at the crosshead 49 (FIGURE 8). The hose 106 is adapted to receive air from an inlet pipe 108 that connects to the block 105 and the hose 107 is adapted to receive lubricant in liquid form from an inlet pipe 109 that connects to the block 105. The lubricant feeds by gravity from a suitable source of supply to the inlet 109. Air under pressure from a suitable source is supplied to the inlet 108. The opposite ends of the flexible tubes 106 and 107 connect, respectively, to the upper ends of the tubes 106*a* and 107*a* which are disposed on the carriage 45. The upper ends of these tubes 106*a* and 107*a* are carried in the movable crosshead 49 and their lower ends are carried in the manifold or lower crosshead 47 (FIGURES 2 and 14). Like the guide rods 48, they are spaced apart sufficiently to clear the cylinder 36 even when the carriage 45 moves and, in fact, are in front of the rods 48. The connector block 105 also carries a fitting 110 at its front face from which extend the lubricant tubes 111 and 112 (FIGURES 1, 7, 8, and 16) which extend over and lubricate the guide rods 48. This oil will also reach the guide member 25.

A control valve 115 (FIGURE 1) is carried by the guide rail 25 at the rear side thereof above the valve 90. Another valve 116 is carried above the valve 115 by the rail 25 at the rear side thereof. These valves are connected in the fluid system with the valves 90, 95 and 96, previously mentioned in a manner to be described. The system also includes an actuating valve which starts the cycle of operation and which is shown at 120 in FIGURE 2 and which is connected in the system in a manner to be described. A manually adjustable valve cock 121 is shown in FIGURE 2 for controlling the speed of the cylinder and piston unit 35. A manually adjustable stop cock 122 is provided in the fitting 109 to control the feed of lubricating oil to be sprayed.

The valve 120 is adapted to be controlled by a movable member of a machine with which the spraying apparatus is to be used. For example, when used with a glass machine of the type suggested in FIGURES 21 to 24, it will be controlled by the movable inverting arm I. The valve is mounted on the glass-forming machine as shown in FIGURES 2 to 6. The valve is suspended by means of a plate 125 which carries clamping bolts 126 that extend through vertical slots 127 in the flange of the mounting bracket 22. When the bolts 126 are released the valve-carrying plate 125 can be precisely adjusted by means of a screw 128 threaded into the bracket 22 and rotatably connected to the plate. Thus, the valve 120 may be accurately located on the glass machine vertically relative to the arm I so that the actuating trigger 130 thereof will be at a proper level to be engaged by the arm.

The trigger 130 is of such shape and is so mounted so that it will open the valve 120 when swung counterclockwise but will have no effect on the valve when swung clockwise by the inverting arm I. Thus, as shown in FIGURE 5, the upper end of the trigger is pivoted by a pin 131 between a pair of lugs 132 depending from the valve housing 133. The valve is of the 2-way poppet type and the lower end of the poppet or stem 134 thereof is engaged by the upper end of the trigger 130, the poppet normally being spring-held downwardly in closed position. When the trigger 130 is swung counterclockwise, the square corner 135 thereof will push the poppet 134 upwardly to open the valve. However, when swung clockwise, the rounded corner 136 will not push the poppet upwardly. Thus, with reference to FIGURES 21 to 24, clockwise swinging of the arm I will actuate the valve 120 but reverse or counterclockwise swinging of the arm will not actuate the valve.

Figure 15:
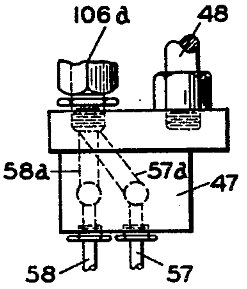
FIGURE 15 is a detail in elevation taken along line 15—15 of FIGURE 14.
Figures 16, 17, 18, 19:
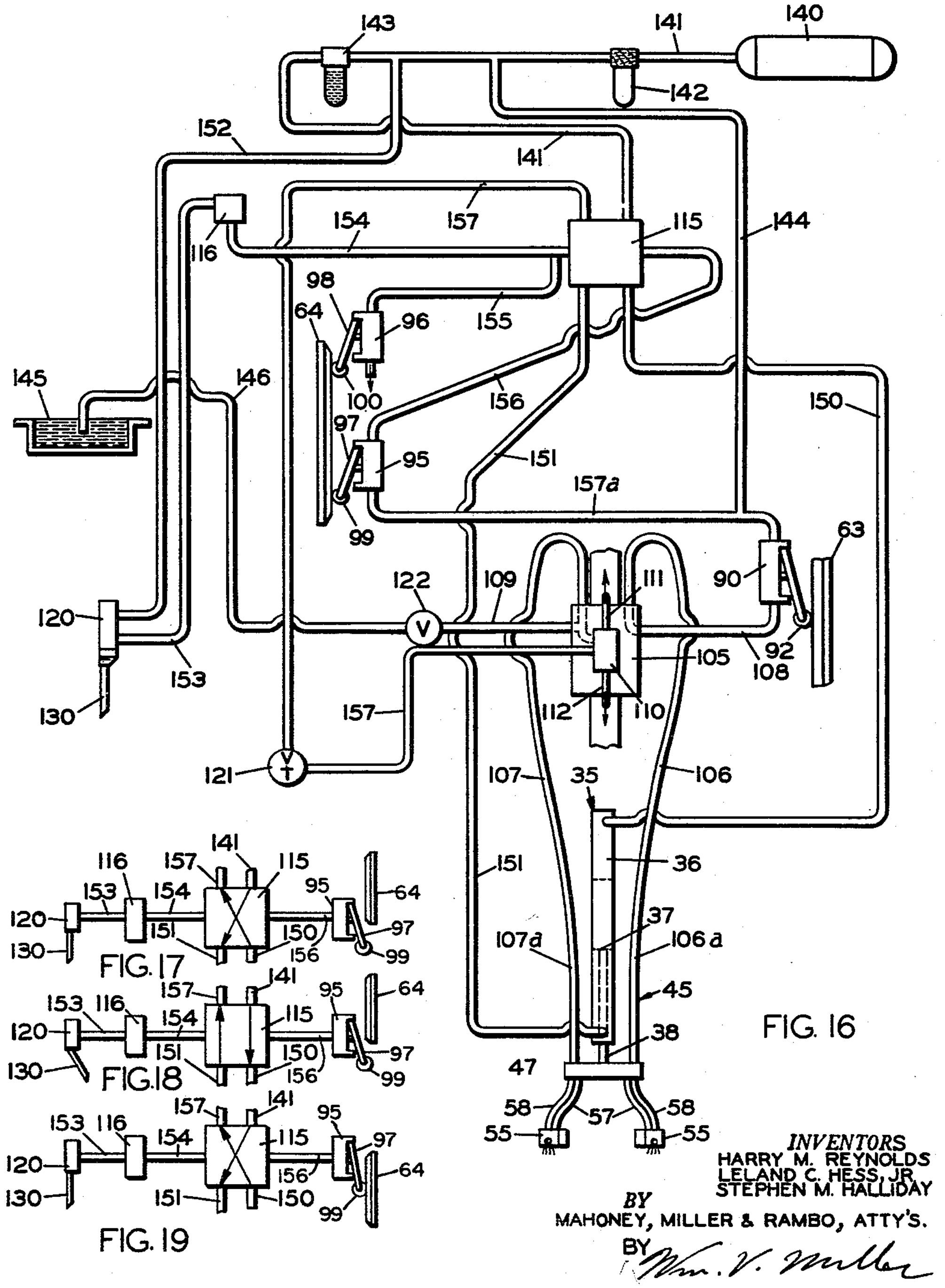
FIGURE 16 is a diagrammatic view of the fluid system of the apparatus.
FIGURE 17 is a diagram showing the condition of part of the control system of the apparatus before the cycle is started.
FIGURE 18 is a similar view showing the system as the cycle is started.
FIGURE 19 is a similar view showing the system as the cycle is completed.

The complete fluid system is shown in FIGURE 16 and includes a source of supply of air under pressure indicated at 140 from which a line 141 leads through a filter 142 and a lubricator 143. Branching from the line 141 is a pressure line 144 for supplying filtered air to the spray valve 90 which conects through the connector 105 (including fitting 108) with the air line 106 (which includes section 106*a*) that supplies air to the manifold 47. The valve 90 is of the 3-way poppet type for supplying air to the manifold 47. The liquid lubricant is supplied from a tank 145 by means of a line 146 which connects to the line 107 through the connector 105 (including the fitting 109). The line 146 is provided with the control cock 122 previously mentioned. The line 107 (including the section 107*a*) leads to the manifold 47. As shown in FIGURES 14 and 15, the manifold is provided with a passage 57*a* which connects to the air lines 57 of the nozzles 55 and receives air from the line 106 and with a passage 58*a* which receives lubricant from the line 107 and which connects to the lubricant lines 58 of the nozzles 55.

The line 141 also connects to the valve 115 through the lubricator 143. The valve 115 is of the four-way spool type. From the valve 115 a line 150 runs to the upper end of the cylinder 36. From the lower end of the cylinder a line 151 runs to the valve 115. A line 157 runs from the valve 115 to the fitting 110 for supplying oil with lubricant to the lubricant tubes 111 and 112. The circuit composed of lines 151 and 157 through valve 115 includes the speed adjusting valve 121. Branching from the line 141 is another line 152 which runs to the valve 120 which, as previously indicated, is of a 3-way poppet type. Leading from this valve 120 is a line 153 which connects to the valve 116 which is of a 2-way single stroke type and a line 154 leads from this latter valve to the valve 115. Branching from the line 154 is a line 155 which runs to the exhaust valve 96 which is of the 2-way poppet type. Another line 156 runs from the valve 115 to the 2-way reversing poppet valve 95 and a line **157*a* leads from this latter valve and merges with the line 144 running to the valve 90. Reciprocating movement of the spool of the valve 115 is controlled by actuating air supplied at one end through the line 154 controlled by the valves 120 and 116 and at the other end by air supplied through the line 156 controlled by the valve 95. The actuation of this valve 115 is illustrated diagrammatically in FIGURES 17 to 19. As indicated in FIGURE 17, before the spraying cycle is started, the valve 115 serves to connect the line 141 to the line 151 and supply pressure into the lower end of the cylinder 36 and to connect the line 150 to the line 157 which connects through the line 155 and the exhaust of the valve 96 to the atmosphere. Thus, the piston 37 will be at its uppermost position. At this time, the cams 63 and 73 will not be actuating the valves 90, 95 and 96**.

Figure 21:
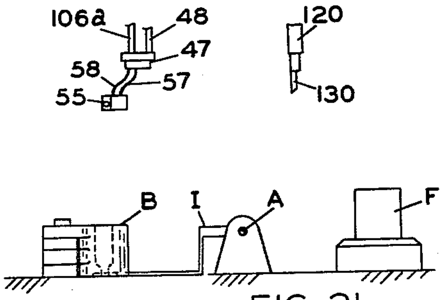
FIGURE 21 is a schematic view showing the spray head of the apparatus in association with the mold of a glass-forming machine before the spraying cycle is started.
Figure 22:
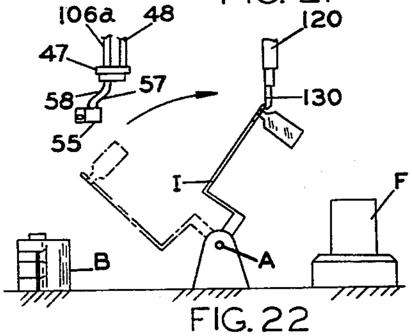
FIGURE 22 is a similar view showing the formed article being removed from the mold with the transfer arm engaging the actuating valve to start the spraying cycle.
Figure 23:
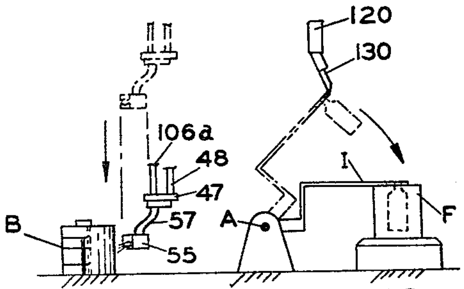
FIGURE 23 is a similar view illustrating the spraying operation.
Figure 24:
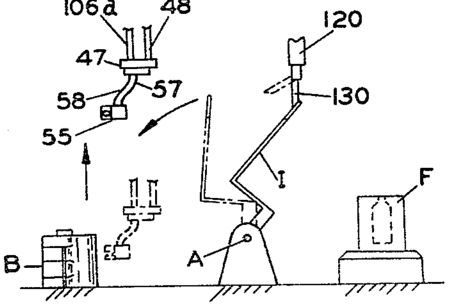
FIGURE 24 is a similar view illustrating the return movement of the transfer arm and the spray head.

The apparatus is started in operation when the valve 120 is opened by the arm I of the glass-forming machine as it swings from the position shown in FIGURE 21, through the successive positions indicated in FIGURES 21 to 23. When the valve 120 is thus opened, a puff of air is supplied through the valve 116 by the line 153 to the line 154 but the valve 116 will prevent return of air to the line 153. This will move the valve 115 to the second position illustrated in FIGURE 18. In the new position, the valve 115 will connect the line 151 to the line 157 and through line 155 to the vent of the valve 96 which has still not been actuated. Thus, the lower end of the cylinder 36 will exhaust through the valve 121. At the same time, the valve 115 will connect the line 141 to the line 150 to supply air to the upper end of the cylinder 36 to start downward movement of the piston 37. The speed of this downward movement can be controlled by the setting of the valve 121. This starts downward movement of the carriage 45 and as it moves downwardly, the cam 63 moves therewith to engage the roller 92 to actuate the valve 90. Opening of the valve 90 controls the spray heads 55 through the line 106 and the spraying action will continue as long as the valve is held open by the cam 63. When the carriage 45 moves downwardly sufficiently, the cam 64 will engage the rollers 100 and 99 and actuate the valves 96 and 95, successively. When the exhaust valve 96 is actuated, it exhausts the line 154 and when the valve 95 is actuated immediately thereafter, air pressure is supplied from the line **157*a* to the line 156 which returns the valve 115 to its original position shown in FIGURE 19 where it serves to make the proper connections to return the piston 37 to its original upper position shown in FIGURE 16. Each time the valve 115 connects the line 141 with the rest of the system, lubricant is supplied thereto. At the time the valve 95 is actuated, the valve 90 is still actuated by the cam 63 and the spraying will continue until the carriage 45 is moved upwardly sufficiently to move the cam 63 from contact with the roller 92**.

The time of starting and stopping the spraying action can be adjusted by adjusting the cam 63 vertically by means of the turnbuckle 61. The length of the spray period can be adjusted by shortening or lengthening the cam 63 by relative adjustment of its sections 71 and 72. The flow of lubricant to be sprayed supplied can be stopped by shutting off the valve 122 or it could be adjusted by setting the valve. The speed of movement of the piston can be adjusted by setting of the valve 121. The stroke of the piston can be varied by adjusting the cylinder 36 vertically of the guide 25. The vertical position of the cam 64 can be adjusted to change the instant at which the reverse movement of the piston is started.

It will be apparent from the above description that this invention provides for a spraying apparatus which will atomize and spray liquid lubricant on a selected article to be treated so as to uniformly coat the article with a proper film of the lubricant. The spraying apparatus may be applied to various machines carrying the article to be treated and can be efficiently timed in accordance with the movements of the machine, being actuated by a suitable moving part thereof. The spraying apparatus will spray the article to be lubricated only during a predetermined selected period and will not interfere with the mechanism of the machine during its various movements. The length of the spray period, the instant it starts and stops, the speed of movement of the spray heads into and out of association with the article, the extent of movement of the spray heads and the instant this movement starts and reverses, can all be readily varied by various adjustments provided on this apparatus.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. Spraying apparatus comprising a guide member, a carriage mounted for reciprocable movement on said guide member and carrying a spray head, a cylinder and piston unit connected between said guide member and said carriage for reciprocating it along the guide member, a first control valve connected to and actuating said unit to move the carriage in one direction along the guide member and adapted to be engaged by an operating movable member, a source of supply of liquid to be sprayed and connected by a supply conduit to said head which includes an atomizing nozzle actuated by air pressure, a source of supply of atomizing air for said nozzle including a supply conduit connected to said nozzle, a second valve for controlling said air supply conduit for said nozzle, a third control valve connected to said unit for controlling reversing of said unit, a cam on said carriage for engaging said third control valve, and a separate cam on said carriage for engaging said second control valve, said first control valve being connected to and controlling a fourth control valve connected between a source of air supply and the cylinder of said unit, said last-named valve having conduits leading to the opposed ends of said cylinder, said guide member comprising a guide rail, the cylinder of said cylinder and piston unit being mounted on the rail with its axis parallel thereto, said carriage including a pair of guide rods located laterally of said guide rail and connecting crossheads, said guide rods being parallel to each other and to the axis of said cylinder and piston unit, said cam for engaging the second control valve being mounted for adjustment along one of said rods and said cam for engaging the third control valve being mounted for adjustment along the other rod, means for adjusting each of said cams independently along its respective guide rod and comprising an adjusting rod parallel to each of said guide rods and to which the cam is operatively connected so that rotation of the adjusting rod will move the cam along its guide rod, said cam for controlling the second control valve being composed of sections carried respectively by its adjusting rod and its associated guide rod, and means for adjustably connecting said sections together to permit lengthening or shortening of said cam in the direction of extent of the cam guide rod and the cam adjusting rod.

2. Apparatus according to claim 1 in which the cylinder is attached to the guide rail by adjustable connections to permit adjustment of it longitudinally of the guide rail.

References Cited by the Examiner

UNITED STATES PATENTS

| | | | |
|---|---|---|---|
| 2,083,633 | 6/37 | Brackett | 118—323 |
| 2,246,502 | 6/41 | Bramsen et al. | 118—7 |
| 2,383,023 | 8/45 | Sykes et al. | 118—317 X |
| 2,518,038 | 8/50 | Malhiot | 118—2 |
| 2,744,494 | 5/56 | Chappen | 118—305 |
| 2,827,009 | 3/58 | Norris | 118—317 X |
| 2,876,358 | 3/59 | Root | 117—95 X |
| 2,928,369 | 3/60 | Way | 118—323 |

FOREIGN PATENTS

| | | |
|---|---|---|
| 611,644 | 11/48 | Great Britain. |

RICHARD D. NEVIUS, *Primary Examiner.*